(12) United States Patent
Isola

(10) Patent No.: US 9,949,232 B1
(45) Date of Patent: Apr. 17, 2018

(54) NETWORK DEVICE LOSS PREVENTION USING A DISTRIBUTED WIRELESS NETWORK

(71) Applicant: BANK OF AMERICA CORPORATION, Charlotte, NC (US)

(72) Inventor: Rahul Isola, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/663,491

(22) Filed: Jul. 28, 2017

(51) Int. Cl.
  *H04W 24/00* (2009.01)
  *H04W 64/00* (2009.01)
  *H04W 4/02* (2018.01)

(52) U.S. Cl.
  CPC .......... *H04W 64/006* (2013.01); *H04W 4/02* (2013.01)

(58) Field of Classification Search
  CPC .............................. H04W 64/006; H04W 4/02
  USPC ........... 455/456.3, 456.1, 404.2, 63.1, 67.13
  See application file for complete search history.

(56) References Cited

U.S. PATENT DOCUMENTS

| | | | |
|---|---|---|---|
| 6,320,496 B1 | 11/2001 | Sokoler et al. | |
| 6,424,834 B1 | 7/2002 | Chang et al. | |
| 6,763,013 B2 | 7/2004 | Kennedy | |
| 6,975,614 B2 | 12/2005 | Kennedy | |
| 7,397,789 B2 | 7/2008 | Chari et al. | |
| 7,649,873 B2 | 1/2010 | Bonta et al. | |
| 7,890,116 B2 | 2/2011 | Salokannel et al. | |
| 8,311,543 B2 | 11/2012 | Dravida et al. | |
| 8,314,736 B2 * | 11/2012 | Moshfeghi | G01S 5/0236 342/465 |
| 8,467,370 B2 | 6/2013 | van Greunen et al. | |
| 8,693,454 B2 * | 4/2014 | Annamalai | H04W 64/00 370/338 |
| 8,767,771 B1 | 7/2014 | Shukla et al. | |
| 9,414,188 B2 * | 8/2016 | Gao | H04W 4/02 |
| 9,430,781 B1 | 8/2016 | Kerr et al. | |
| 9,521,536 B2 | 12/2016 | Fodor et al. | |
| 9,578,674 B2 * | 2/2017 | Visuri | H04W 48/16 |
| 9,838,997 B2 * | 12/2017 | Smith | H04W 64/006 |
| 9,843,891 B2 * | 12/2017 | Moshfeghi | H04W 4/02 |

(Continued)

OTHER PUBLICATIONS

Isola, R., "Network Device Location Detection and Monitoring Using a Distributed Wireless Network," U.S. Appl. No. 15/663,277, filed Jul. 28, 2017, 54 pages.

(Continued)

*Primary Examiner* — Marceau Milord
(74) *Attorney, Agent, or Firm* — Michael A. Springs

(57) ABSTRACT

A system that includes a plurality of access points and a device tracking controller. The device tracking controller is configured to receive signal strength information for a first endpoint device and a second endpoint device from at least one access point from the plurality of access points. The device tracking controller is further configured to determine a first device location for the first endpoint device and a second device location for the second endpoint device based on the location of the at least one access point. The device tracking controller is further configured to periodically update the first device location and the second device location. The device tracking controller is further configured to compare the first device location to the second device location and to send a notification when the first endpoint device and the second endpoint device are in different locations.

20 Claims, 9 Drawing Sheets

(56) References Cited

U.S. PATENT DOCUMENTS

| | | | |
|---|---|---|---|
| 9,860,868 B2* | 1/2018 | Smith | H04W 64/006 |
| 2014/0191868 A1 | 7/2014 | Ortiz et al. | |
| 2015/0004974 A1* | 1/2015 | Karimi-Cherkandi | H04W 48/16 455/435.2 |
| 2015/0197010 A1* | 7/2015 | Ruuspakka | B25J 9/1664 700/245 |
| 2016/0050526 A1 | 2/2016 | Liu et al. | |
| 2017/0142636 A1* | 5/2017 | Joshi | H04W 40/005 |
| 2017/0156113 A1* | 6/2017 | Visuri | H04W 52/0229 |

OTHER PUBLICATIONS

Isola, R., "Network Device Navigation Using a Distributed Wireless Network," U.S. Appl. No. 15/663,428, filed Jul. 28, 2017, 53 pages.

Isola, R., "Zone-Based Network Device Monitoring Using a Distributed Wireless Network," U.S. Appl. No. 15/663,539, 53 pages.

* cited by examiner

NETWORK DEVICE LOSS PREVENTION USING A DISTRIBUTED WIRELESS NETWORK

TECHNICAL FIELD

The present disclosure relates generally to telecommunications, and more specifically to distributed wireless networks.

BACKGROUND

Many enterprises have expansive networks that include a large number of network devices. These networks include a combination of interconnected wired and wireless devices. One of the technical challenges that occurs in a conventional network environment is the inability to track and/or monitor the location of wireless network devices. Wired network devices are fixed to known locations. However, wireless devices are mobile and can be physically located anywhere within a network. The inability to locate and tracking wireless network devices leaves the network vulnerable to security threats such as unauthorized access to network devices and theft.

Conventional systems blindly provide connectivity to wireless network devices and do not have knowledge about the physical location of the wireless network devices within their network. Without knowledge of the physical location of a wireless network device, conventional systems are unable to track and monitor the location of the wireless device as it moves around the network which limits their abilities to provide hardware protection and network security. Thus, it is desirable to provide a solution that provides the ability to locate and monitor the location of wireless network devices within a network.

SUMMARY

One of the technical challenges that occurs in computer technology, such as a conventional network environment, is the inability to track and/or monitor the location of wireless network devices. Wired network devices are fixed to known locations. However, wireless devices are mobile and can be physically located anywhere within a network. The inability to locate and tracking wireless network devices leaves the network vulnerable to security threats such as unauthorized access to network devices and theft. Conventional systems blindly provide connectivity to wireless network devices and do not have knowledge about the physical location of the wireless network devices within their network. Without knowledge of the physical location of a wireless network device, conventional systems are unable to track and monitor the location of wireless devices as they move around the network which limits their abilities to provide hardware protection and network security.

The system described in the present application provides a technical solution that enables the system to locate and monitor the physical location of wireless network devices. The ability to locate and monitor the physical location of wireless network devices improves the operation of the system and the security of the network. The system is able to associate wireless network devices with its user and determine the location of the user and the wireless network devices. This information allows the system to detect when a network device is lost or stolen based on location and/or movement within the network. The system is also able to provide navigation instructions to a wireless network device based on its determined location within the network. The system is also able to detect movement patterns and behaviors that are associated with the wireless network devices and their users. This information can also be used to detect when a wireless device and its user exhibit abnormal behavior such as entering unauthorized areas. Thus, the system provides an unconventional technical solution that allows the system to protect itself and its hardware.

In one embodiment, the system determines the location of a wireless network device using information provided by one or more access points. For example, the system determines which access points are close the wireless network device based on received signal strength information from the access points. The system is able to determine the location of the wireless network device based on the location of the access points in signal communication with the wireless network device and the signal strength between the wireless network device and the access points. For example, the system is able to triangulate the position of the wireless network device within the network based on the signal strength information provided by the access points. This process allows the system to locate and track the wireless network device within the network.

In another embodiment, the system determines the location of a wireless network device and provides navigation instructions to an object of interest within the network. For example, the system may receive a request from a wireless network device for navigation instructions to a particular object (e.g. a product or workspace). The system determines the location of the object of interest and the location of the wireless network device within the network. The system then determines path between the object of interest and the wireless network device and provides instructions for how to move to the object of interest. This process allows the system to use determined information about the locations of wireless network devices and other objects within the network to provide navigation instructions and guidance.

In another embodiment, the system determines when a user becomes separated from a wireless network device. For example, the system determines a pair of wireless network devices associated with a user typically move together within the network. The system tracks the location and movement of the wireless network devices as they move around the network. The system determines when one of the wireless network devices becomes in a different location than the other wireless network device. For example, a user may have drop or left one of the wireless network device in one location and walked away to another location. The system sends a notification to the user (e.g. the wireless network devices) indicating that the wireless network devices have become separated. This process allows the system to prevent hardware loss and theft by tracking the location of wireless network devices and determining when they may have become separated from their user.

In another embodiment, the system generates profiles based on the behavior of wireless network devices and their users. For example, the system determines a set of wireless network devices that are typically within a workspace based on information provided by one or more access points. The system associates the set of wireless network devices with the workspace and generates a profile for the workspace identifying the set of wireless network devices. In some embodiments, the system also generates user profiles based on information about the wireless network device's user provided by the access points. The system uses the generated profiles to detect abnormal behavior within the network. For example, the system detects when a user enters a restricted access area based on detecting their wireless network device and determining the wireless network device is not a member of the set of wireless network devices associated with the restricted access area. This process allows the system to detect potential security threats and abnormal behavior which provides protection for the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
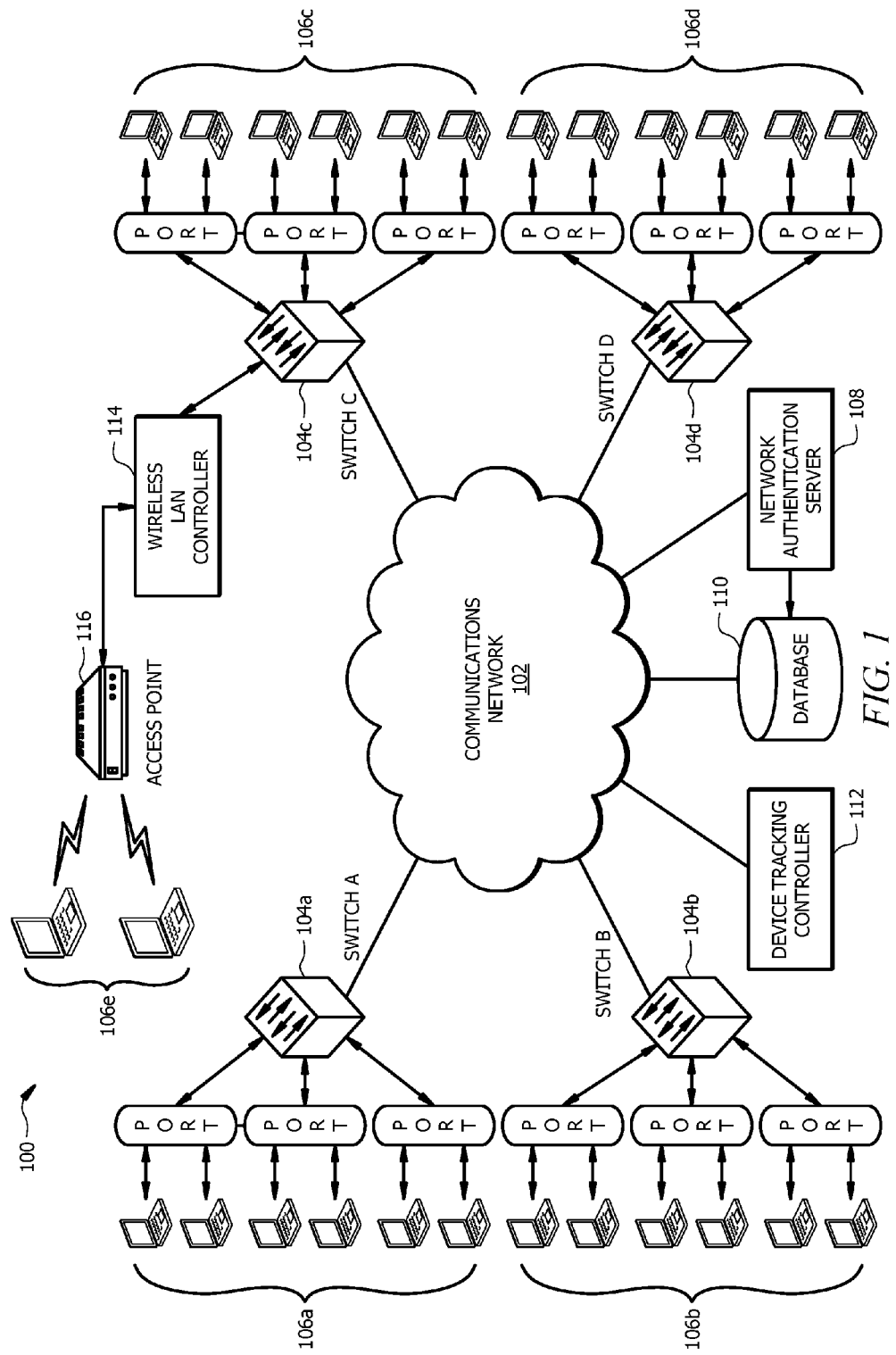
FIG. 1 is a schematic diagram of an embodiment of a system configured to implement a distributed network with network access control.

FIG. 1 is a schematic diagram of an embodiment of a system 100 configured to implement network access control. System 100 is generally configured to support a number of different operations, including but not limited to, locating wireless network devices and monitoring the location of wireless network devices.

In one embodiment, the system 100 is configured to determine the physical location of an endpoint device 106 (e.g. a wireless network device) using information provided by one or more access points 116. For example, a device tracking controller 112 determines the physical location of the endpoint device 106 based on the location of the access points 116 in signal communication with the endpoint device 106 and the signal strength between the endpoint device 106 and the access points 116. In this configuration, the system 100 provides improved network security and data access control by providing the ability to track and monitor the physical location of endpoint devices 106 within the communications network 102. An example of the system 100 operating in this configuration is described in FIG. 4.

In another embodiment, the system 100 is configured to determine the physical location of an endpoint device 106 and to provide navigation instructions to an object of interest within the communications network 102. For example, a device tracking controller 112 may receive a request from an endpoint device 106 for navigation instructions to a particular object (e.g. another endpoint device 106, a product, or workspace). The device tracking controller 112 determines the physical location of the object of interest and the physical location of the endpoint device 106 within the communications network 102. The device tracking controller 112 determines path between the object of interest and the endpoint device 106 and provides instructions for the endpoint device 106 to move toward the object of interest. In this configuration, the system 100 provides improved network security and data access control by providing the ability to locate endpoint devices 106 and to generate personalized navigation instructions for the endpoint devices 106 within the communications network 102. An example of the system 100 operating in this configuration is described in FIG. 6.

In another embodiment, the system 100 is configured to determine when a user becomes separated from an endpoint device 106. For example, a device tracking controller 112 tracks the location and movement of endpoint devices associated with the user as they move around the communications network 102. The device tracking controller 112 determines when one of the endpoint devices 106 becomes in a different location than the other endpoint device 106. For example, a user may have drop or left one of the endpoint devices in one location and walked away to another location. The device tracking controller 112 sends a notification to the user indicating that the endpoint devices 106 have become separated. In this configuration, the system 100 provides improved network security and data access control by preventing hardware loss and theft by tracking the location of endpoint devices 106 and determining when they may have become separated from their user. An example of the system 100 operating in this configuration is described in FIG. 8.

In another embodiment, the system 100 is configured to generate profiles (e.g. user profiles 214 and zone profiles 216) based on the behavior of endpoint devices 106 and their users. For example, a device tracking controller 112 determines a set of endpoint devices 106 that are typically within a workspace based on information provided by one or more access points 116. The device tracking controller 112 associates the set of endpoint devices 106 with the workspace and generates a profile (e.g. a zone profile 216) for the workspace identifying the set of endpoint devices 106. In another embodiment, the device tracking controller 112 generates user profiles 214 based on information about the endpoint device's 106 user provided by the access points 116. The device tracking controller 112 uses the generated profiles to detect abnormal behavior within the communications network 102. For example, the device tracking controller 112 detects when a user enters a restricted access area based on detecting their endpoint device 106 and determining the endpoint device 106 is not a member of the set of endpoint devices 106 associated with the restricted access area. In this configuration, the system 100 provides improved network security and data access control by providing the ability to detect potential security threats and abnormal behavior which provides protection for the communications network 102. An example of the system 100 operating in this configuration is described in FIG. 9.

In some embodiments, the system 110 is further configured for identifying unknown or undesirable devices (e.g., non-compliant, rogue, or malicious devices), determining the location of the undesirable devices, collecting information from a switch connected to the undesirable devices, and blocking the undesirable devices from being able to access the network and/or isolate the undesirable in a safe zone within the network. For example, the system 100 is configured to detect when a bad actor connects a malicious device to port on a switch. The system 100 is configured to identify the malicious device and to block the malicious device from accessing the network. In other examples, the system 100 is configured to isolate and monitor malicious devices. Isolating and monitoring malicious devices allows the system 100 to collect information about malicious devices, which may be later used to further improve the security of the system 100.

In some embodiments, the system 100 is configured to authenticate a user, to determine disconnection capabilities of switches coupled to undesirable devices, to facilitate disconnecting undesirable devices, and to monitor the network for subsequent connection attempts by the undesirable devices to reconnect to the network. For example, the system 100 is configured to identify malicious devices that are attempting to connect to the network and to block the malicious devices from accessing the network. Detecting, removing, and blocking malicious devices from the network allow the system 100 to enhance network security by providing improved data access control. In some embodiments, these tasks may be performed by a particular device, such as a threat management server 112. In other implementations, these tasks may be performed in a distributed fashion using various components that interact with each other over a network.

System 100 comprises switches 104, endpoint devices 106, a network authentication server (NAS) 108, a database 110, a threat management server 112, a wireless LAN controller 114, and an access point 116 interconnected by one or more networks, represented by communications network 102. System 100 may be configured as shown in FIG. 1 or in any other suitable configuration as would be appreciated by one of ordinary skill in the art upon viewing this disclosure.

The communications network 102 represents communication equipment, including hardware and any appropriate controlling logic, for interconnecting elements and facilitating communication between interconnected elements. The communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 102 may include any combination of gateways, routers, hubs, switches, access points, base stations, and any other hardware, software, or a combination of the preceding that may implement any suitable protocol. The communications network 102 may include other types of networks, including wireless or wired networks.

The communications network 102 is configured to interconnect the switches 104, the endpoint devices 106, the NAS 108, the database 110, the threat management server 112, the wireless LAN controller 114, and the access point 116. The use of the communications network 102 facilitates identifying, blocking, and/or monitoring of undesirable devices regardless of the geographic location or communication protocols employed by network components or devices on the network. While only one communications network 102 has been illustrated, it should be understood that other embodiments may operate using multiple communications networks 102. In addition, other embodiments may employ one or more wired and wireless networks in communications networks 106.

System 100 comprises switches 104a, 104b, 104c, and 104d operably coupled to the communications network 102. The switches 104 represent communication equipment, including hardware and any appropriate controlling logic, for interconnecting and facilitating data communication to and from endpoint devices 106. Examples of switches 104 include, but are not limited to, gateways, call managers, routers, hubs, switches, access points, base stations, cellular towers, radio networks, satellite telephone equipment implementing appropriate protocols for wireless telephony communications. While only a select number of switches 104 have been illustrated, it should be understood that other embodiments may operate using any suitable number of switches 104. In addition, other embodiments may incorporate switches 104 in other wired or wireless networks coupled to the communications network 102 of system 100.

The access point 116 is any network hardware device (and accompanying software) that allows an endpoint device 106 to connect to the communications network 102. An example of the access point 116 includes, but is not limited to, a router. In some instances, an access point 116 may also be referred to as a light-weight access point. The access point 116 may allow for both wireless connections and wired connections to the communications network 102. For example, an endpoint device 106 may connect wirelessly to the access point 116 or may connect to the access point 116 via a wired connection (e.g. an Ethernet cable). The system 100 may comprise any suitable number of access points 116. The access points 116 may be members configured to form a WiFi network, a bluetooth network, a Zigbee network, or any other suitable type of wireless network.

The wireless LAN controller 114 is configured to control and manage the access points 116. For example, the wireless LAN controller 114 may configure the access points 116 to connect to communications network 102. In some embodiments, the wireless LAN controller 114 may screen wireless connection attempts to the communications network 102 and may block attempts that are deemed suspicious or compromised. For example, the wireless LAN controller 114 may maintain a blacklist that identifies endpoint devices 106 that should be blocked from connecting wirelessly to the communications network 102. The wireless LAN controller 114 can connect to the access point 116 and vice versa to allow for end point devices 106 to connect to the communications network 102 via the access point 116 and wireless LAN controller 114. In FIG. 1, the wireless LAN controller 114 is shown operably coupled to a single access point 116. In other examples, the wireless LAN controller 114 may be configured to manage and control any number of access points 116 of system 100.

System 100 comprises endpoint devices 106a, 106b, 106c, 106d, and 106e operably coupled to the communications network 102 through switches 104. The endpoint devices 106 represent any suitable hardware, including appropriate controlling logic and data, capable of connecting to and communicating data over a network. For example, endpoint devices 106 may include wired or wireless devices including, but not limited to, workstations, laptops or notebook computer systems, printers, Voice over Internet Protocol (VoIP) telephones, Internet Protocol (IP) phones, mobile telephones, advanced phones (e.g. smartphones), personal digital assistants (PDAs), wireless handsets, notebook computer systems, tablet computer systems, embedded devices, network sniffers, auxiliary devices, or the like. The endpoint devices 106 may be capable of transmitting and receiving any forms of media including, but not limited to, audio, video, images, text messages, and other data formats, and documents and accessing disparate network-based services.

The NAS 108 represents any appropriate combination of hardware, controlling logic, and data that facilitates user authentication, admission control and logging, policy enforcement, auditing, and security associated with the communications network 102. In some embodiments, the NAS 108 may represent a networked server or collection of networked servers. The NAS 108 may be directly or indirectly coupled to other systems such as the database 110 to store and retrieve information related to network access control and authentication. In one embodiment, the NAS 108 is configured to track attempted and actual connections by endpoint devices 106 to the communications network 102 using switches 104. For example, the NAS 108 may monitor and track the MAC address and/or IP address associated with endpoint devices 106 on communications network 102 and the IP address and/or port of the switch 104 coupled to those endpoint devices 106.

The NAS 108 is configured to authenticate endpoint devices 106 that are connected to a port of a switch 104. The NAS 108 may authenticate endpoint device 106 using an 802.1X protocol, a MAC authentication Bypass (MAB) whitelist, or any other suitable protocol. For example, the NAS 108 may be configured to determine whether the MAC address of an endpoint device 106 is present in a MAB whitelist. The NAS 108 may authenticate the endpoint device 106 when the endpoint device 106 is present in the MAB whitelist. The NAS 108 may also be configured to automatically fail authentication for endpoint devices 106 that are present in a blacklist. In one embodiment, the NAS 108 is configured to send a device identifier identifying an endpoint device 106 in response to the endpoint device 106 connecting to the switch 104. In another embodiment, the NAS 108 is configured to send a device identifier identifying an endpoint device 106 in response to the endpoint device 106 in response to the endpoint device 106 failing authentication.

In certain implementations, the NAS 108 may log appropriate information about each network access attempt by endpoint devices 106 by communicating with database 110 and/or the threat management server 112. For example, the NAS 108 may log information about endpoint devices 106 that pass or fail authentication in a device log file. In one embodiment, the functionality of the NAS 108 may be provided by a third-party data server. In particular embodiments, the activity recorded at the NAS 108 may be accessed by a log server (not shown) and utilized as an intermediate data repository.

The database 110 comprises suitable hardware and software, including memory and control logic, for storing, accessing, retrieving, and communicating various types of information, for example, network activity data. The database 110 may include any suitable combination of volatile or non-volatile, local or remote devices suitable for storing and maintaining information. For example, the database 110 may include random access memory (RAM), read only memory (ROM), solid state storage devices, magnetic storage devices, optical storage devices, or any other suitable information storage device or a combination of such devices. In one embodiment, the database 110 represents a relational database for storing connection logs and network activity logs of endpoints 106 in a retrievable manner. The database 110 may represent a database service provided by a third-party. In one embodiment, the database 110 may represent a database for storing all connection details related to endpoint devices 106. For example, the database 110 may maintain network activity information such as IP addresses/MAC addresses associated with endpoint devices 106 and IP addresses of switches 104 coupled to particular endpoint devices 106. The database 110 may also maintain port information (e.g. port addresses) for switches 104 or endpoint devices 106. The database 110 may be directly or indirectly coupled to other systems such as the NAS 108 and be capable of storing and retrieving information related to network access based on instructions from the NAS 108. In particular embodiments, the storage and functionality of database 110 may be provided by a third party data server. In some embodiments, the database 110 may reside on an network authentication server, such as the NAS 108.

The device tracking controller 112 represents any appropriate combination of hardware, controlling logic, and data for facilitating locating endpoint devices 106 and/or active monitoring of endpoint devices 106. For example, the device tracking controller 112 may represent a network server or collection of network servers capable of communicating with other elements of the system 100 to monitor the location of endpoint devices 106 and to prevent access to the network based on appropriate control logic. Additional information about the device tracking controller 112 is described in FIG. 2.

In particular embodiments, the device tracking controller 112 may comprise suitable memory to store lists of trusted and untrusted devices. For example, the device tracking controller 112 may maintain one or more whitelists that identify endpoint devices 106 which are known to be trustworthy. In addition, the device tracking controller 112 may maintain one or more blacklists that identify endpoint devices 106 which are known to be untrustworthy. In particular embodiments, the blacklists maintained by the device tracking controller 112 may include endpoint devices 106 that have previously been disconnected from the communications network 102.

In FIG. 1, the device tracking controller 112 is operably coupled to the communications network 102 to facilitate communication with other elements of the system 100. For example, the device tracking controller 112 may retrieve information from the NAS 108, the database 110, and/or switches 104 to prevent allowing network access to undesired endpoint devices 106. In particular embodiments, the functionality of the device tracking controller 112 may be provided by a third party data server. In some embodiments, the device tracking controller 112 may reside on another data server or its functionality may be provided by another data server, such as the NAS 108.

In one embodiment, using an appropriate user interface, the device tracking controller 112 may be accessed to initiate identifying, blocking, and/or isolating an endpoint device 106. As an example, the user interface may be an interface accessible through a web browser or an application on an endpoint device 106. In one embodiments, the device tracking controller 112 may access the NAS 108 and/or the database 110 to determine the IP address of the switch 104 coupled to the endpoint device 106 using its MAC address. In another embodiment, the device tracking controller 112 may transform the MAC/IP address of an endpoint device 106 into an IP address of the switch 104 coupled to the endpoint device 106. For example, the device tracking controller 112 may use a mapping function that transforms the MAC/IP address of the endpoint device 106 to the IP address of the switch 104 connected to the endpoint device 106. The device tracking controller 112 may employ any suitable mapping function or technique as would be appreciated by one of ordinary skill in the art. In other embodiments, the device tracking controller 112 may use any other technique to determine the IP address of the switch 104 connected to an endpoint device 106.

The device tracking controller 112 may use the IP address of the switch 104 to access the switch 104 to obtain information about the switch 104, for example port information and available features of the switch, and to issue commands to block the endpoint device 106, either logically or physically, from accessing the communications network 102. The device tracking controller 112 is configured to send one or more commands to logically and/or physically block or isolate the endpoint device 106 from the communications network 102.

In one embodiment, logically disabling or blocking an endpoint device 106 may involve blackholing the endpoint device 106. Blackholing refers to discarding or dropping frames associated with communications from a particular endpoint device 106.

In another embodiment, disabling or blocking an endpoint device 106 may involve physically disconnecting an endpoint device 106 from the communications network 102. For example, the device tracking controller 112 is configured to send one or more disable commands that triggers a switch 104 to shut off electrical power to the port of the switch 104 that is connected to the endpoint device 106. In one embodiment, this process involves transforming the port from an active (e.g. ON) state to an inactive (e.g. OFF) state. Depending on the network architecture and the type of other endpoint devices 106 that are connected to the same port on the switch 104, physically disconnecting the port may be a viable option to disconnect an undesirable endpoint device 106 from accessing the communications network 102.

In another embodiment, logically disabling or blocking an endpoint device 106 may involve rerouting data traffic associated with the endpoint device 106 to a safe zone. A safe zone refers to a network location that is deemed to be safe to receive traffic from an untrusted device. For example, a safe zone may represent an empty port or a port on a switch 104 that is connected to devices with acceptable levels of risk, such as a VoIP phone, a printer, or a display. Rerouting traffic associated with an endpoint device 106 to a safe zone mitigates the impact of malicious activity. In one embodiment, a safe zone may also be a network traffic monitoring server that enables live monitoring, recording, and/or forensic analysis of data traffic associated with an endpoint device 106. In one embodiment, the device tracking controller 112 sends a reroute command identifying the endpoint device 106 to the switch 104. For example, the reroute command may comprise the device identifier for the endpoint device 106. The switch 104 is configured to transform the destination of traffic associated with the endpoint device 106 to a safe zone in response to receiving the reroute command. Transferring the traffic associated with the endpoint device 106 to the safe zone allows the endpoint device 106 to be monitored and recorded in a low-risk environment without jeopardizing the system 100 and communications network 102.

In one embodiment, the device tracking controller 112 is configured to send one or more commands that triggers a switch 104 to reduce or limit the bandwidth or throughput of the port an endpoint device 106 is connected to. Reducing the bandwidth or throughput of the port the endpoint device 106 is connected to allows the endpoint device 106 to stay engaged with the communications network 102 in a safe manner which allows information to be collected about the endpoint device 106 and its activities. For example, the device tracking controller 112 may send a command to a switch 104 to reduce the bandwidth of the port connected to an endpoint device 106 and to reroute traffic associated with the endpoint device 106 to a safe zone for recording and/or forensic analysis. In this example, the endpoint device 106 has limited bandwidth which mitigates the impact of any malicious activities performed by the endpoint device 106 while data is collected about the endpoint device 106.

Figure 2:
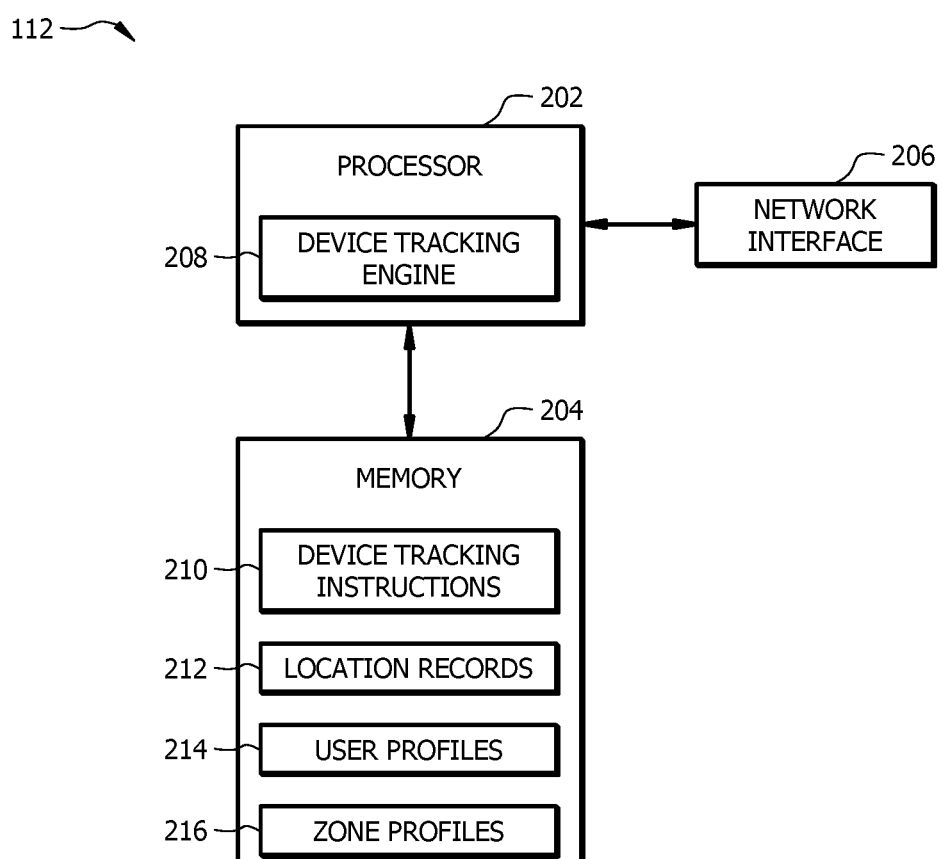
FIG. 2 is a schematic diagram of an embodiment of a device tracking controller.

FIG. 2 is a schematic diagram of an embodiment of a device tracking controller 112. The device tracking controller 112 comprises a processor 202, a memory 204, and a network interface 206. The device tracking controller 112 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a device tracking engine 208. In an embodiment, the device tracking engine 208 is implemented using logic units, FPGAs, ASICs, DSPs, or any other suitable hardware. The device tracking engine 208 is configured to implement a specific set of rules or process that provides an improved technological result.

In one embodiment, the device tracking engine 208 is configured to determine the physical location of an endpoint device 106 (e.g. a wireless network device) using information provided by one or more access points 116. For example, the device tracking engine 208 determines the physical location of the endpoint device 106 based on the location of the access points 116 in signal communication with the endpoint device 106 and the signal strength between the endpoint device 106 and the access points 116. In this configuration, the device tracking engine 208 provides improved network security and data access control by providing the ability to track and monitor the physical location of endpoint devices 106 within the communications network 102. An example of the device tracking engine 208 operating in this configuration is described in FIG. 4.

In another embodiment, the device tracking engine 208 is configured to determine the physical location of an endpoint device 106 and to provide navigation instructions to an object of interest within the communications network 102. For example, the device tracking engine 208 may receive a request from an endpoint device 106 for navigation instructions to a particular object (e.g. another endpoint device 106, a product, or workspace). The device tracking engine 208 determines the physical location of the object of interest and the physical location of the endpoint device 106 within the communications network 102. The device tracking engine 208 determines path between the object of interest and the endpoint device 106 and provides instructions for the endpoint device 106 to move toward the object of interest. In this configuration, the device tracking engine 208 provides improved network security and data access control by providing the ability to locate endpoint devices 106 and to generate personalized navigation instructions for the endpoint devices 106 within the communications network 102. An example of the device tracking engine 208 operating in this configuration is described in FIG. 6.

In another embodiment, the device tracking engine 208 is configured to determine when a user becomes separated from an endpoint device 106. The device tracking engine 208 tracks the location and movement of endpoint devices 106 associated with the user as they move around the communications network 102. The device tracking engine 208 determines when one of the endpoint devices 106 becomes in a different location than the other endpoint device 106. For example, a user may have drop or left one of the endpoint devices 106 in one location and walked away to another location. The device tracking engine 208 sends a notification to the user indicating that the endpoint devices 106 have become separated. In this configuration, the device tracking engine 208 provides improved network security and data access control by preventing hardware loss and theft by tracking the location of endpoint devices 106 and determining when they may have become separated from their user. An example of the device tracking engine 208 operating in this configuration is described in FIG. 8.

In another embodiment, the device tracking engine 208 is configured to generate profiles (e.g. user profiles 214 and zone profiles 216) based on the behavior of endpoint devices 106 and their users. For example, the device tracking engine 208 determines a set of endpoint devices 106 that are typically within a workspace based on information provided by one or more access points 116. The device tracking engine 208 associates the set of endpoint devices 106 with the workspace and generates a profile (e.g. a zone profile 216) for the workspace identifying the set of endpoint devices 106. In one embodiment, the device tracking engine 208 generates user profiles 214 based on information about the endpoint device's 106 user provided by the access points 116. The device tracking engine 208 uses the generated profiles to detect abnormal behavior within the communications network 102. For example, the device tracking engine 208 detects when a user enters a restricted access area based on detecting their endpoint device 106 and determining the endpoint device 106 is not a member of the set of endpoint devices 106 associated with the restricted access area. In this configuration, the device tracking engine 208 provides improved network security and data access control by providing the ability to detect potential security threats and abnormal behavior which provides protection for the communications network 102. An example of the device tracking engine 208 operating in this configuration is described in FIG. 9.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, ternary content-addressable memory (TCAM), dynamic random-access memory (DRAM), and static random-access memory (SRAM). The memory 204 is operable to store device tracking instructions 210, location records 212, user profiles 214, zone profiles 216, and/or any other data or instructions. The device tracking instructions 210 comprise any suitable set of instructions, logic, rules, or code operable to execute the device tracking engine 208.

Location records 212 comprise location information for objects within an environment 300. For example, the location records 212 may be a data structure (e.g. a table) identifying a plurality of objects and a zone 302 or area 304 within an environment 300 where each of the objects is physically located. Examples of objects include, but are not limited to, products, merchandise, endpoint devices 106, access points 116, users, workspaces, and/or any other objects or places of interest. An example of using a location record 212 is described in FIGS. 3 and 4.

User profiles 214 comprise information about users associated with one or more endpoint devices 106 connected to the communications network 102. The user profile 214 may be a data structure (e.g. a table) that links a user with one or more endpoint devices 106. The user profile 214 may comprise user information, an employee identification, access restrictions, access privileges, device information, manufacturer information, time stamps, movement behavior, and/or any other suitable type of information. An example of using a user profile 214 is described in FIG. 9.

Zone profiles 216 comprise information about endpoint devices 106 connected to the communications network 102 that are linked with a particular zone 302 or area 304 within an environment 300. The zone profile 216 may be a data structure (e.g. a table) that links an identified set of endpoint device 106 with a particular zone 302 or area 304 within an environment 300. For example, the zone profile 216 may identify endpoint devices 106 linked with a restricted access area of a company. The zone profile 216 may comprise user information, device information, manufacturer information, a MAC address, an IP address, time stamps, and/or any other suitable type of information. An example of using a zone profile 216 is described in FIG. 9.

The network interface 206 is configured to enable wired and/or wireless communications. The network interface 206 is configured to communicate data through the system 100, the communications network 102, and/or any other system or domain. For example, the network interface 206 may be configured for communication with a modem, a switch, a router, a bridge, a server, or a client. The processor 202 is configured to send and receive data using the network interface 206 from the communications network 102.

Figure 3:
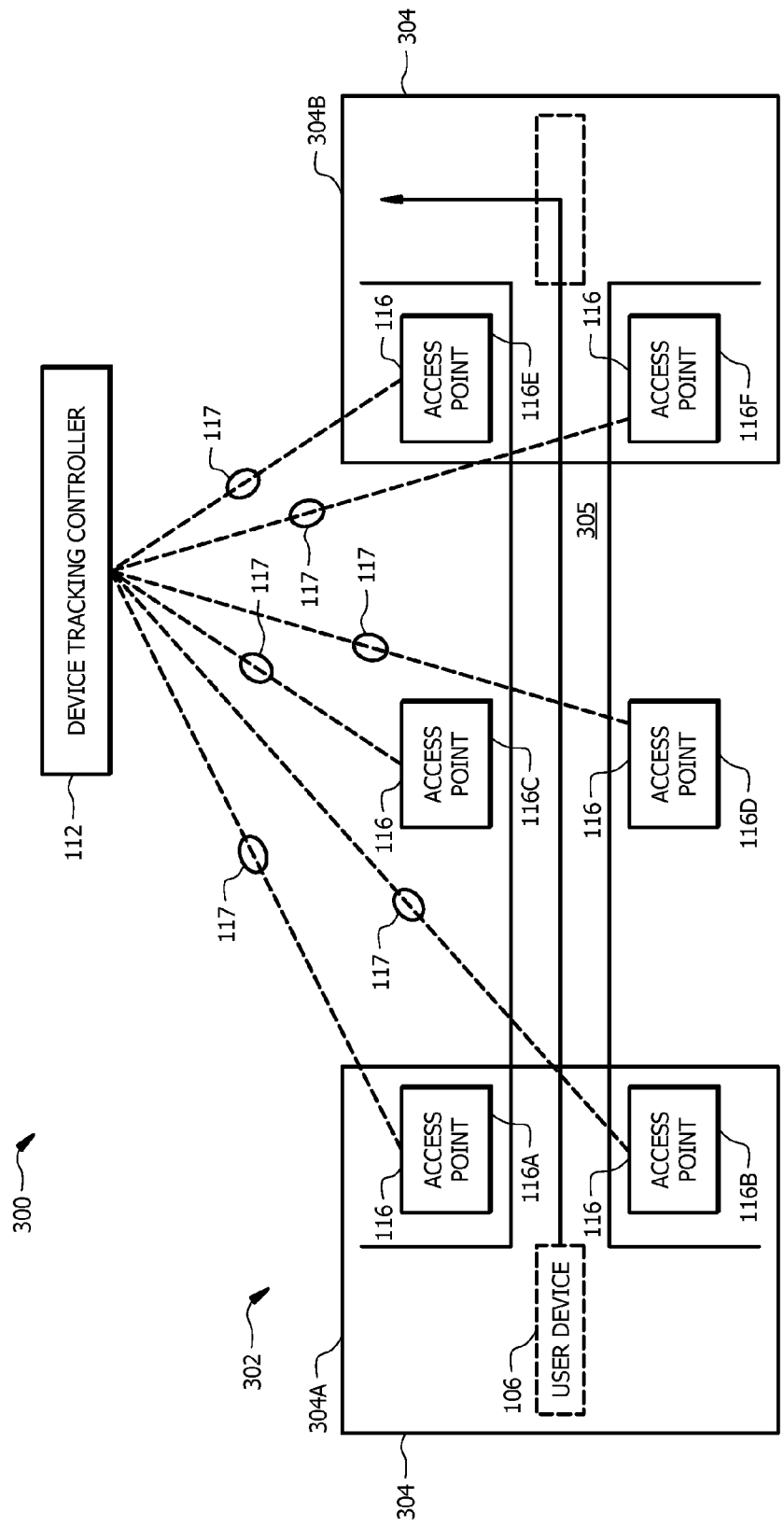
FIG. 3 is a schematic diagram of the device tracking controller configured for wireless device tracking in an environment.

FIG. 3 is a schematic diagram of the device tracking controller 112 configured for wireless device tracking in an environment 300. Examples of environments 300 include, but are not limited to, a home, an office building, a building complex, a mall, a shopping center, a store, an outdoor environment, or any other suitable type of space. Environments 300 can be further divided into different zones 302 and areas 304. A zone 302 is a sub-section of an environment 300 and an area 304 is a sub-section of a zone 302. For example, in FIG. 3, the environment 300 may be an office building, the zone 302 may be a floor of the office building, and the area 304 may be a particular portion of the floor or room of the office building. An environment 300 can be partitioned into any other type of and/or number of zones 302 and areas 304.

The environment 300 comprises the device tracking controller 112 in signal communication with a plurality of access points 116. The device tracking controller 112 and the plurality of access points 116 may employ any suitable type of wired or wireless connections 117 to communicate with each other. The device tracking controller 112 and the plurality of access points 116 may also employ any suitable communications protocol for communicating with each other. For example, the device tracking controller 112 and the access points 116 may be members of a WiFi network and configured to communicate with each other using wireless links or connections.

In FIG. 3, the access points 116 are shown distributed along both sides of a hallway 305. In other examples, the access points 116 may be distributed in any suitable configuration throughout the environment 300. The access points 116 are configured to communicate with an endpoint device 106 and/or measure the signal strength of communicating with the endpoint device 106. As an example, the endpoint device 106 may be a mobile phone and the access points 116 are configured to measure the signal strength of communicating with then endpoint device 106 as the user walks down the hallway 305 from an area 304A to an area 304B. In one embodiment, the signal strength information is a received signal strength indicator (RSSI). The measured signal strength between the endpoint device 106 and an access point 116 corresponds with how close the endpoint device 106 is to the access point 116. In other words, an access point 116 that is closer to the endpoint device 106 will have a stronger or higher signal strength than an access point 116 that is further away from the endpoint device 106. In other examples, the access points 116 may send any other suitable type of information for indicating a signal strength between an access point 116 and an endpoint device 106.

The access points 116 are further configured to communicate the measured signal strengths with the device tracking controller 112. The device tracking controller 112 is configured to receive the measured signal strength information from the access points 116 and to determine the location of the endpoint device 106 within the environment based on the measured signal strength information. In some embodiments, the device tracking controller 112 is configured to request or receive other information, for example device information, from the access points 116 to determine the location of the endpoint device 106. An example of the device tracking controller 112 determining the location of the endpoint device 106 is described in FIG. 4.

Figure 4:
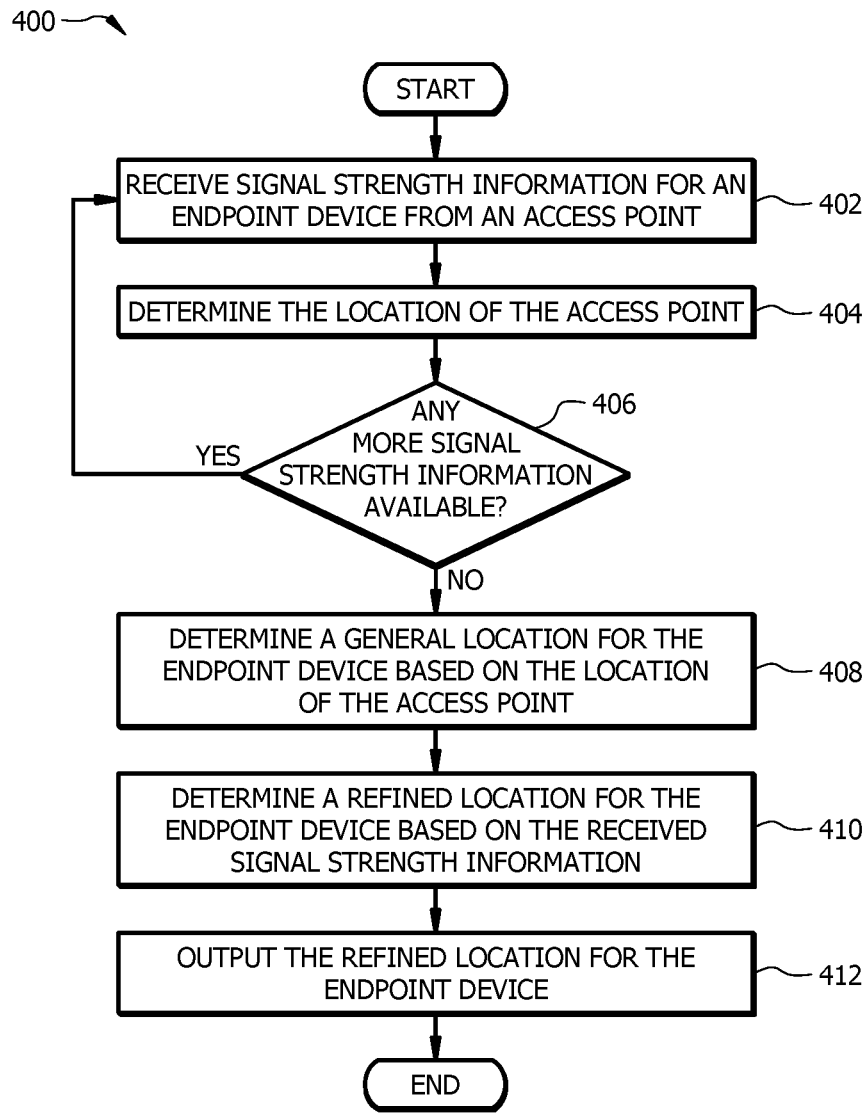
FIG. 4 is a flowchart of an embodiment of a wireless device tracking method.

FIG. 4 is a flowchart of an embodiment of a wireless device tracking method 400. Method 400 is implemented by the device tracking controller 112 to determine the location of an endpoint device 106 and to monitor the movement of the endpoint device 106 as the endpoint device 106 moves around an environment 300. The ability to locate and track wireless network devices protects the network and the wireless device from security threats such as unauthorized access to the wireless device and theft. Conventional systems are unable to locate and track the physical position of wireless network devices. In contrast, system 100 provides a mechanism for determining the physical location of an endpoint device 106 and monitoring the movement of the endpoint device 106 as the endpoint device 106 moves around an environment 300 using information provided by one or more access points 116.

A non-limiting example is provided to illustrate how the device tracking controller 112 implements method 400 to determine the location of an endpoint device 106 and to monitor the movement of the endpoint device 106. As an example, at a first time instance, the device tracking controller 112 determines the location of an endpoint device 106 within an environment 300.

At step 402, the device tracking controller 112 receives signal strength information for an endpoint device 106 from an access point 116. For example, referring to FIG. 3, the device tracking controller 112 receives signal strength information (e.g. an RSSI) from access point 116A. In one embodiment, the device tracking controller 112 also receives device information for the endpoint device 106. For example, the device tracking controller 112 may receive a device identifier, an IP address, a MAC address, or any other suitable information for the endpoint device 106.

At step 404, the device tracking controller 112 determines the location of the access point 116. For example, the device tracking controller 112 may determine where the access point 116A is physically located within the environment 300. In one embodiment, the device tracking controller 112 may query the access point 116 for location information for the access point 116. In another embodiment, the device tracking controller 112 may query a network map or location records 212 to determine where the access point 116 is physically located. In other embodiments, the device tracking controller 112 may employ any other suitable technique for determining the location of the access point 116 within the environment.

At step 406, the device tracking controller 112 determines whether there is any more signal strength information available for the endpoint device 106. Referring again to FIG. 3, the device tracking controller 112 may determine that signal strength information is available from access point 116B and/or any other access points 116. The device tracking controller 112 returns to step 402 when there is additional signal strength information available for the endpoint device 106. The device tracking controller 112 returns to step 402 to continue collecting signal strength information for the endpoint device 106 from one or more other access points 116. The device tracking controller 112 proceeds to step 408 when there is no more signal strength information available for the endpoint device 106.

At step 408, the device tracking controller 112 determines a general location for the endpoint device 106 based on the location of the one or more access points 116. The presence of signal strength information from the one or more access points 116 indicates the endpoint device 106 is in proximity to the one or more access points 116. The device tracking controller 112 correlates the physical location of the access points 116 providing signal strength information with the general physical location of the endpoint device 106. Referring to FIG. 3, the device tracking controller 112 may determine the general location of the endpoint device 106 is within zone 302 of the environment 300 in response to receiving signal strength information from the access points 116 in zone 302. For example, the device tracking controller 112 is able to determine the general location of an endpoint device 106 is on a particular floor of an office building in response to receiving signal strength information from one or more access points 116 on that floor of the office building.

At step 410, the device tracking controller 112 determines a refined location for the endpoint device 106 based on the received signal strength information. The signal strength comprises information indicating how close the endpoint device 106 is to an access point 116 based on the signal strength between the endpoint device 106 and the access point 116. Referring to FIG. 3, the device tracking controller 112 determines that the endpoint device 106 is closer to access points 116A and 116B than access points 116C and 116D based on the received signal strength. Based on the received signal strength information, the device tracking controller 112 is able to determine a refined location for the endpoint device 106 is within area 304A of zone 302. In other words, the device tracking controller 112 uses the received signal strength information to refine the location of the endpoint device 106 within the identified general location for the endpoint device 106. The refined location of the endpoint device 106 provides a more precise physical location for the endpoint device 106 based on its proximity to one or more access points 116 in signal communication with the endpoint device 106. In one embodiment, the device tracking controller 112 may perform triangulation using the received signal strength information to determine the refined location for the endpoint device 106. In other embodiments, the device tracking controller 112 may employ any other suitable operation or technique using the received signal strength information to determine the refined location for the endpoint device 106.

At step 412, the device tracking controller 112 outputs the refined location for the endpoint device 106. For example, the device tracking controller 112 may output the refined location for the endpoint device 106 to a log or file stored in a memory (e.g. memory 204). As another example, the device tracking controller 112 may output the refined location for the endpoint device 106 to a graphical user display for a network operator. In other examples, the device tracking controller 112 may output the refined location for the endpoint device 106 to any other suitable medium.

The device tracking controller 112 may be configured to periodically execute method 400 to continuously monitor the location of the endpoint device 106 over time. For example, referring to FIG. 3 at a second time instance, the device tracking controller 112 receives signal strength information from access points 116E and 116F. The device tracking controller 112 is able to determine the general location for the endpoint device 106 is still zone 302 and the refined location for the endpoint device 106 is now area 304B within zone 302. In other words, the device tracking controller 112 is able to determine the new location of the endpoint device 106 as well as the direction of travel for the user and the endpoint device 106. In one embodiment, the device tracking controller 112 generates a log of refined locations for an endpoint device 106 and determines the direction of travel for the user and the endpoint device 106 based on the log of refined locations. This process may be repeated periodically at any suitable rate to continuously monitor the location and movement of the endpoint device 106 over time.

In one embodiment, the device tracking controller 112 uses received device information to request additional information about the endpoint device 106 and/or its user. For example, the device tracking controller 112 may receive an IP address for the endpoint device 106 and may use the IP address to request additional device information from a switch 104 connected to the endpoint device 106.

Figure 5:
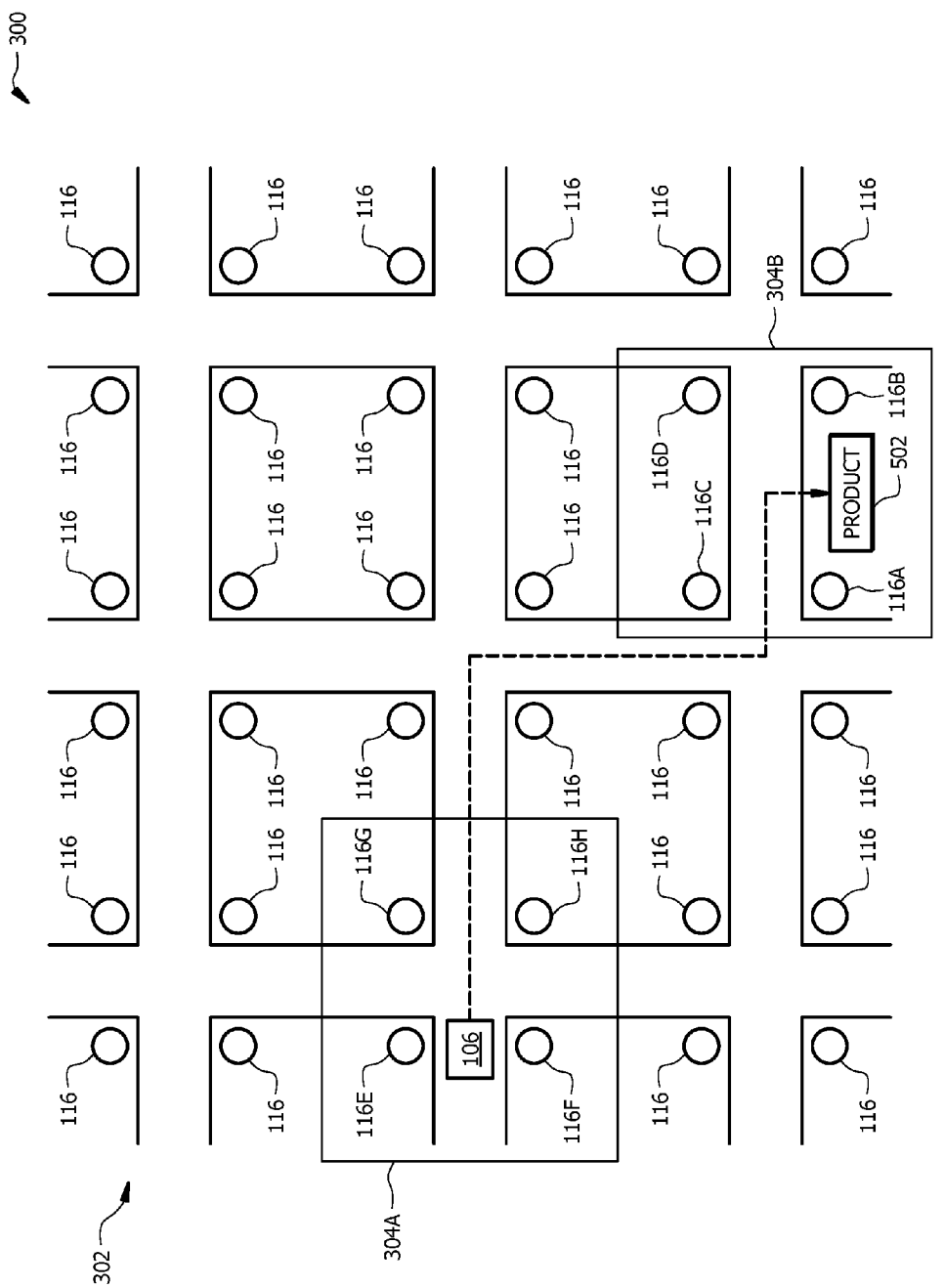
FIG. 5 is a bird's eye view of an embodiment of the system configured for wireless device navigation.

FIG. 5 is a bird's eye view of an embodiment of the system 100 configured for wireless device navigation. FIG. 5 illustrates a zone 302 within an environment 300 that comprises a plurality of access points 116. For example, the environment 300 may be a store and the zone 302 may be portion of the store. The plurality of access points 116 are in signal communication with a device tracking controller 112 (not shown).

The device tracking controller 112 is configured to use information provided by one or more of the access points 116 to determine the physical location of endpoint devices 106 and other objects of interest within the environment 300 and to provide navigation instructions for the endpoint devices 106 to the objects of interest. For example, the device tracking controller 112 is configured to receive a request for navigation instructions from an endpoint device 106. The request identifies a particular product 502 in the store. The device tracking controller 112 is configured to determine the physical location of the endpoint device 106 (e.g. area 304A) and the physical location of the product (e.g. area 304B) within the store and to provide navigation instructions for a path 504 from the location of the endpoint device 106 to the product 502.

Figure 6:
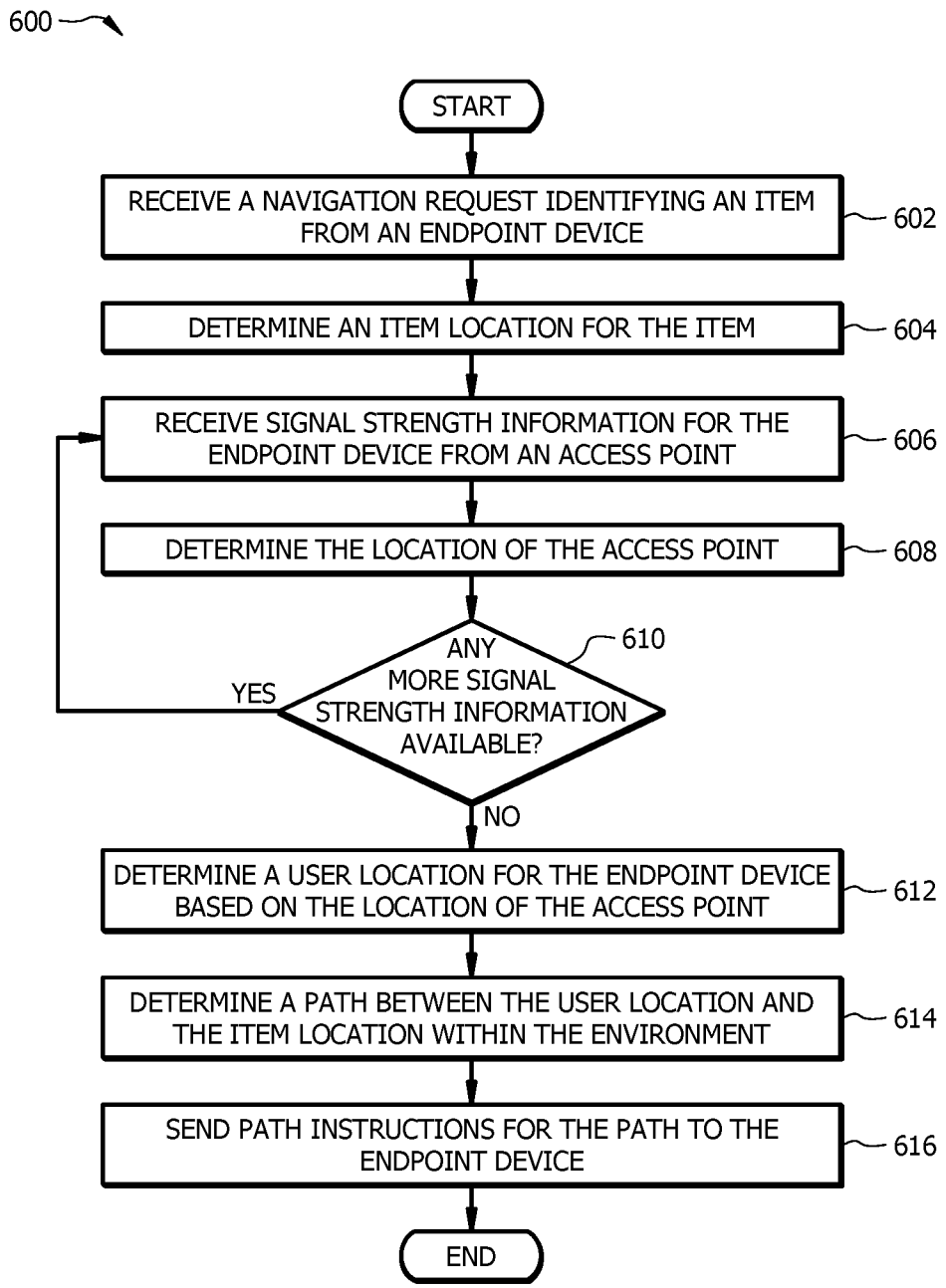
FIG. 6 is a flowchart of an embodiment of a wireless device navigation method.

An example of the device tracking controller 112 determining the location of the endpoint device 106 and providing navigation instructions to an object of interest is described in FIG. 6.

FIG. 6 is a flowchart of an embodiment of a wireless device navigation method 600. Method 600 is implemented by the device tracking controller 112 to determine the location of an endpoint device 106 and provide navigation instructions to an object of interest within an environment 300. The ability to locate and track objects and wireless network devices within an environment enables the ability to provide navigation instruction and guidance between different wireless network device and objects within the environment. Since conventional system are unable to locate and track the physical location of wireless network devices, they are also unable to provide the ability of on-demand navigation instructions for wireless network devices within the environment. In contrast, system 100 provides a mechanism for on-demand navigation instructions for an endpoint device 106 to an object of interest and/or another endpoint device 106 based on information provided by one or more access points 116.

A non-limiting example is provided to illustrate how the device tracking controller 112 implements method 600 to determine the location of an endpoint point device 106 and an object of interest and to provide navigation instructions to the object of interest. As an example, a user uses an endpoint device 106 (e.g. a mobile phone) to request the navigation instructions for a product within a store.

At step 602, the device tracking controller 112 receives a navigation request from an endpoint device 106 identifying an item or object of interest. The navigation request comprises one or more item identifiers that identify a particular object. Examples of an item identifier include, but are not limited to, a name, an item number, a vendor name, a model number, a MAC address, an IP address, a barcode, an image, or any other suitable type of descriptor for an object. For example, referring to FIG. 5, the endpoint device 106 may send a navigation request that comprises an item number or a barcode for a particular product 502 within a store to the device tracking controller 112. As another example, the endpoint device 106 may send a navigation request comprising a MAC address or an IP address for another endpoint device 106 within a workspace to the device tracking controller 112.

At step 604, the device tracking controller 112 determines an item location for the item. In one embodiment, the device tracking controller 112 queries the location record 212 to determine the location of the item. For example, the device tracking controller 112 may use the item identifier to look-up the item location in the location record 212. The location record 212 may provide location information identify the location (e.g. zone 302 and/or area 304) of the item within the environment 300.

In another embodiment, the device tracking controller 112 may perform a process similar to method 400 described in FIG. 4 to determine the location of the item. For example, the item may be a network enabled device or stored in a network enabled device that is in signal communication with one or more access points 116. Referring to FIG. 5, the product 502 may be in a network enabled container that is signal communication with access points 116A, 116B, 116C, and 116D. The device tracking controller 112 may use signal strength information provided by access points 116A, 116B, 116C, and 116D to determine a general location and/or a refined location for the product 502. In this example, the device tracking controller 112 determines the item is located in area 304B.

At step 606, the device tracking controller 112 receives signal strength information for the endpoint device 106 from an access point 116. The device tracking controller 112 may receive signal strength information for the endpoint device 106 using a process similar to the process described in step 402 of FIG. 4.

At step 608, the device tracking controller 112 determines the location of the access point 116. The device tracking controller 112 may determine the location of the access point 116 using a process similar to the process described in step 402 of FIG. 4.

At step 610, the device tracking controller 112 determines whether there is any more signal strength information available for the endpoint device 106. The device tracking controller 112 returns to step 606 when there is additional signal strength information available for the endpoint device 106. The device tracking controller 112 returns to step 606 to continue collecting signal strength information for the endpoint device 106 from one or more other access points 116. The device tracking controller 112 proceeds to step 612 when there is no more signal strength information available for the endpoint device 106.

At step 612, the device tracking controller 112 determines a user location based on the location of the one or more access points 116. The device tracking controller 112 may determine a user location for the user and the endpoint device 106 using a process similar to the process described in step 402 of FIG. 4. For example, referring to FIG. 5, the endpoint device 106 may be in signal communication with access points 116E, 116F, 116G, and 116H. The device tracking controller 112 may use signal strength information provided by access points 116E, 116F, 116G, and 116H to determine a general location and/or a refined location for the endpoint device 106 which may be used as the user location. In this example, the device tracking controller 112 determines the user and endpoint device 106 are located in area 304A.

At step 614, the device tracking controller 112 determines a path between the user location and the item location within the environment 300 and generates path instructions for the path. For example, the device tracking controller 112 identifies a path within the environment 300 for the user to traverse to move area 304A to area 304B where the requested item is located. The device tracking controller 112 may employ any suitable technique for determining the path between the user location and the item location. In one embodiment, the path instructions comprises a graphical representation of the environment 300 and identifies the location of the endpoint device 106, the location of the object of interest, and the path. In other embodiments, the path instructions comprise text or audio instructions for traversing the path.

At step 616, the device tracking controller 112 sends path instructions for the path to the endpoint device 106. The device tracking controller 112 may send the path instructions to the endpoint device 106 using any suitable messaging protocol or technique as would be appreciated by one of ordinary skill in the art.

Figure 7:
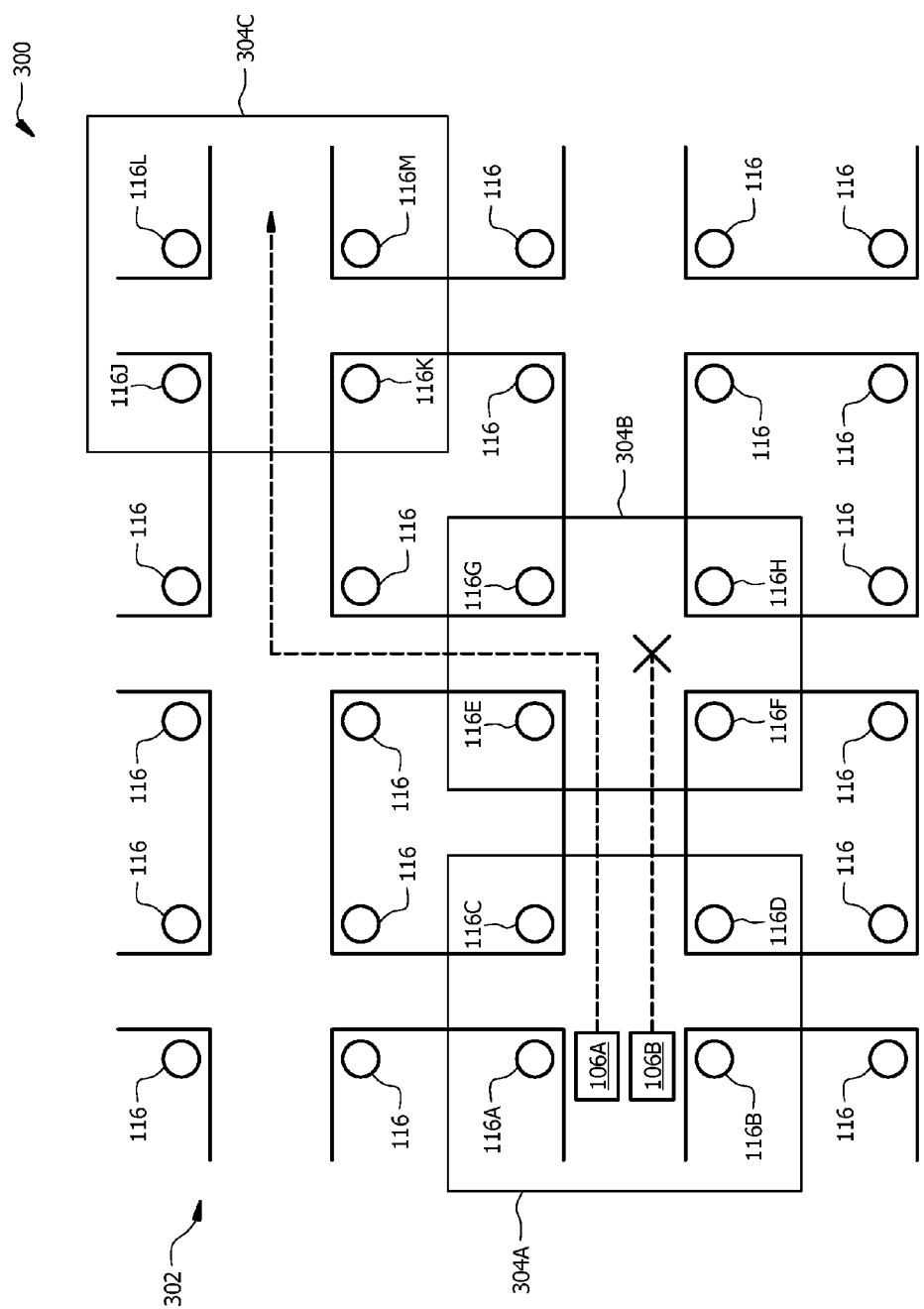
FIG. 7 is a bird's eye view of an embodiment of the system configured for wireless device loss prevention.

FIG. 7 is a bird's eye view of an embodiment of the system 100 configured for wireless device loss prevention. FIG. 7 illustrates a zone 302 within a plurality of access points 116. For example, the environment 300 may be an office workspace and the zone 302 may be a portion of the office workspace. The plurality of access points 116 are in signal communication with a device tracking controller 112 (not shown).

The device tracking controller 112 is configured to use information provided by one or more of the access points 116 to track the physical location of endpoint devices 106 associated with a user and to detect when the user becomes separated from an endpoint device 106. For example, the device tracking controller 112 is configured to track a user's endpoint device 106A and 106B as the user moves from a first area 304A to a second area 304B and a third area 304C. The device tracking controller 112 is configured to detect when the endpoint devices 106A and 106B become separated from each other and are located in different areas. For instances, the device tracking engine 112 detects one endpoint device 106B is located in area 304B and the other endpoint device 106A has continued moving to area 304C. In this example, the user may have dropped or left the endpoint device 106B in the area 304B and continued walking to area 304C with the other endpoint device 106A. The device tracking controller 112 sends a notification to the user indicating that endpoint device 106B has been left in area 304B. An example of the device tracking controller 112 detecting a lost endpoint device 106 is described in FIG. 8.

Figure 8:
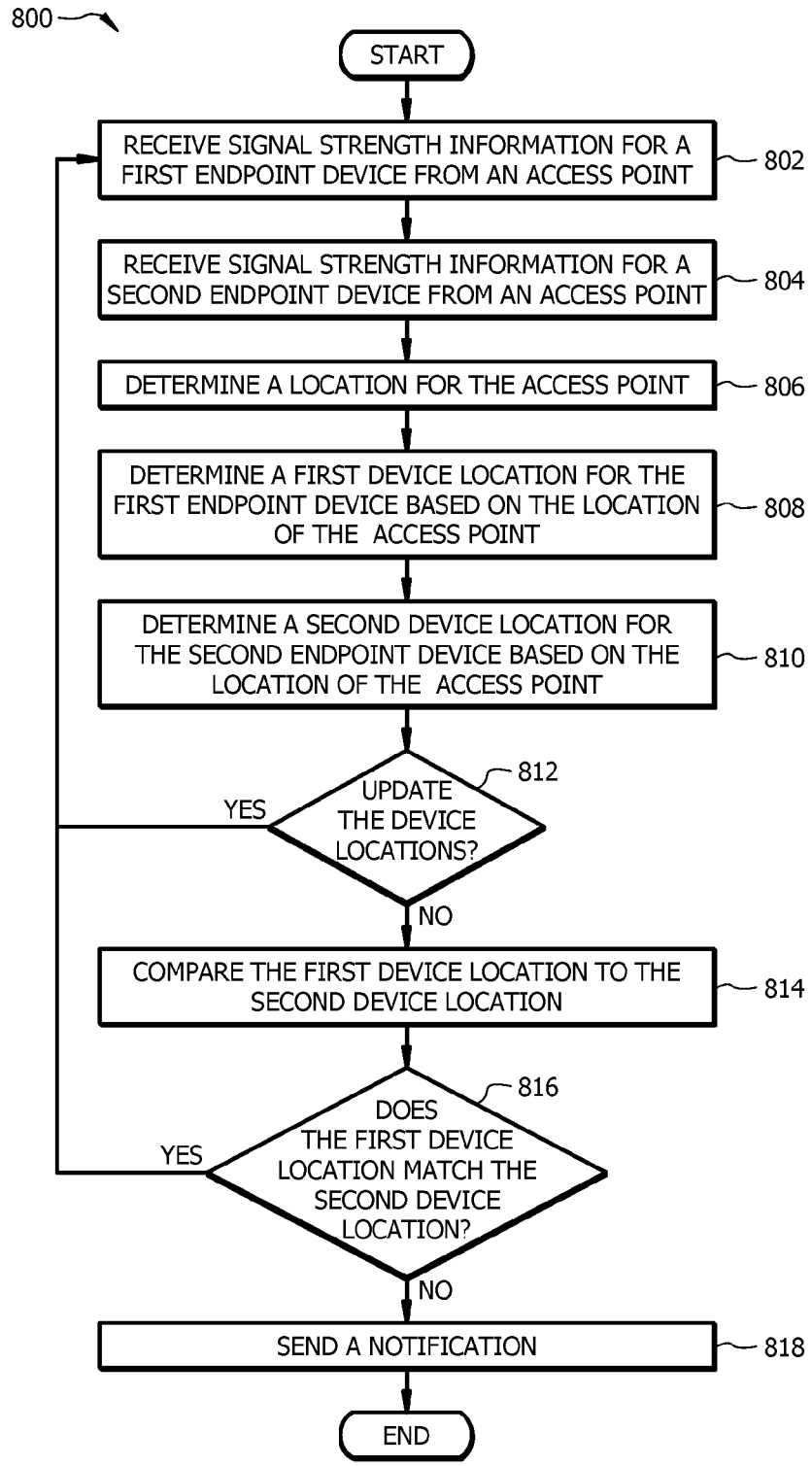
FIG. 8 is a flowchart of an embodiment of a wireless device loss prevention detection method.

FIG. 8 is a flowchart of an embodiment of a wireless device loss prevention detection method 800. Method 800 is implemented by the device tracking controller 112 to detect when a user becomes separated from an endpoint device 106. This process allows the system 100 to prevent hardware loss and theft by tracking the location of endpoint devices 106 and determining when they have become separated from their user. Since conventional system are unable to locate and track the physical location of wireless network devices, they are also unable to provide the ability to detect when an wireless network device has been dropped or left somewhere by its user. In contrast, system 100 provides the ability to both track the movement of endpoint devices 106 as well as detect when they have become separated from their user using information provided by one or more access points 116.

A non-limiting example is provided to illustrate how the device tracking controller 112 implements method 800 to monitor the movement of endpoint devices 106 and to detect when they have become separated from their user. For example, a user may be walking around an environment 300 carrying two endpoint devices 106. The first endpoint device 106 is a laptop and the second endpoint device 106 is a mobile phone.

At step 802, the device tracking controller 112 receives signal strength information for a first endpoint device 106 from one or more access point 116. The device controller 112 may receive the signal strength information for the first endpoint device 106 using a process similar to the process described in step 402 in FIG. 4. For example, referring to FIG. 7, the device tracking controller 112 may receive signal strength information for endpoint device 106A from access points 116A, 116B, 116C, and 116D.

At step 804, the device tracking controller 112 receives signal strength information for a second endpoint device 106 from the one or more access point 116. The device controller 112 may receive the signal strength information for the second endpoint device 106 using a process similar to the process described in step 402 in FIG. 4. For example, referring to FIG. 7, the device tracking controller 112 may also receive signal strength information for endpoint device 106B from access points 116A, 116B, 116C, and 116D.

At step 806, the device tracking controller 112 determines a location for the one or more access points 116. The device controller 112 may determine the location for the one or more access points 116 using a process similar to the process described in step 404 in FIG. 4. For example, referring to FIG. 7, the device tracking controller 112 may determine that access points 116A, 116B, 116C, and 116D are located in area 304A of the environment 300.

At step 808, the device tracking controller 112 determines a first device location for the first endpoint device 106 based on the location of the one or more access points 116 providing signal strength information for the first endpoint device 106. For example, referring to FIG. 7, the device tracking controller 112 determines endpoint 106A is located in area 304A of the environment 300 based on receiving signal strength information from access points 116A, 116B, 116C, and 116D.

At step 810, the device tracking controller 112 determines a second device location for the second endpoint device 106 based on the location of the one or more access points 116 based on the location of the one or more access points 116 providing signal strength information for the second endpoint device 106. For example, referring to FIG. 7, the device tracking controller 112 determines endpoint 106B is located in area 304A of the environment 300 based on receiving signal strength information from access points 116A, 116B, 116C, and 116D.

At step 812, the device tracking controller 112 determines whether to update the device locations for the first endpoint device 106 and the second endpoint device 106. The device tracking controller 112 may periodically update the device locations of the first endpoint device 106 and the second endpoint device 106. For example, the device tracking controller 112 may use a timer to periodically update the device locations for the first endpoint device 106 and the second endpoint device 106 at predetermined intervals of time. The device tracking controller 112 may update the device locations using any suitable time intervals. For example, the device tracking controller 112 may update the device locations every 30 seconds, 1 hour, 2 hours, etc. The device tracking controller 112 proceeds to step 814 when the device tracking controller 112 determines to not update the device locations for the first endpoint device 106 and the second endpoint device 106. The device tracking controller 112 returns to step 802 when the device tracking controller 112 determines to update the device locations for the first endpoint device 106 and the second endpoint device 106.

At step 814, the device tracking controller 112 compares the first device location to the second device location. At step 816, the device tracking controller 112 determines whether the first device location matches the second device location. In other words, the device tracking controller 112 determines whether the first endpoint device 106 is in the same location (e.g. area) as the second endpoint device 106. For example, referring to FIG. 7, the device tracking controller 112 compares the first device location (e.g. area 304A) for endpoint device 106A and the second device location (e.g. area 304A) for endpoint device 106B and determines the first device location and the second device location are the same (e.g. area 304A). The device tracking controller 112 returns to step 802 to continue monitoring the location of the endpoint devices 106 when the device tracking controller 112 determines the first device location and the second device location are the same. The device tracking controller 112 proceeds to step 818 when the first device location is different from the second device location. When the first device location is different that the second device location indicates that the first endpoint device 106 and the second endpoint device 106 are in different physical locations within the environment 300. The device tracking controller 112 determines the endpoint devices 106 have become separated in response to determining the first device location is different from the second device location.

As an example, referring to FIG. 7 at a second time instance, the device tracking controller 112 may determine the first device location is area 304C and the second device location is area 304B. When the device tracking controller 112 compares the first device location and the second device location, the device tracking controller 112 will determine endpoint device 106A and endpoint device 106B have become separated. In one embodiment, the device tracking controller 112 may also determine that endpoint device 106B is not moving and has been in approximately the same location as endpoint device 106A continues to move within the environment 300. In this example, the device tracking controller 112 may identify endpoint device 106B as a lost endpoint device 106. In another embodiment, the device tracking controller 112 may determine that endpoint device 106A and 106B are traveling in different directions. This may indicate that someone else has possession of one of the user's endpoint devices 106.

At step 818, the device tracking controller 112 sends a notification to the first endpoint device 106 and/or the second endpoint device 106. The notification indicates the first endpoint device 106 and the second endpoint device 106 have become separated. For example, the notification may be an alert notifying the user they have dropped or forgotten an endpoint device 106. The notification may comprise a device identifier, device information, user information, a device location, a manufacturer identifier for the endpoint device 106, a time stamp, any other suitable information, or combinations thereof. The device tracking controller 112 may send the notification using any suitable messaging protocol or technique. For example, the notification may be an email, a text message (e.g. a short message service (SMS) message), an application pop-up alert, or any other suitable type of message notification.

Figure 9:
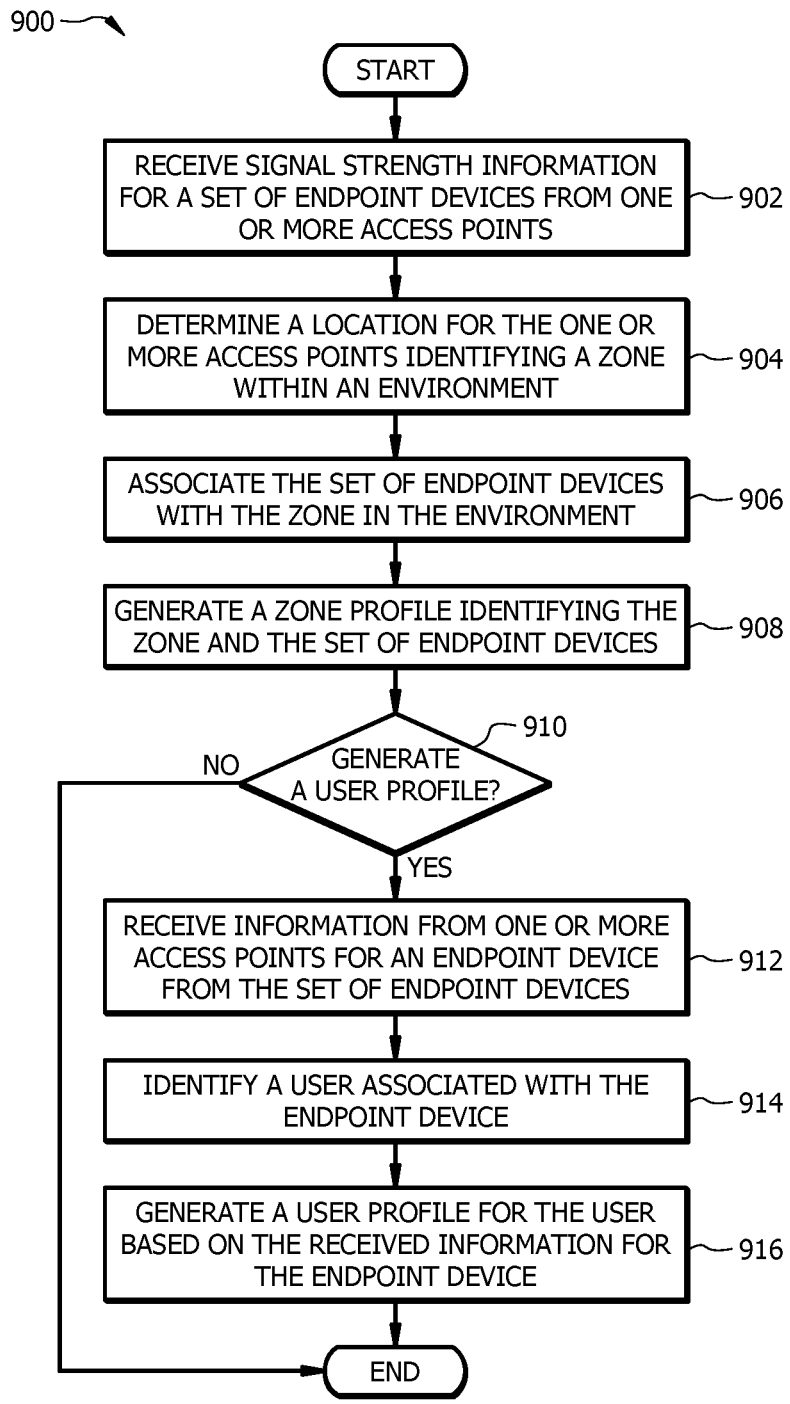
FIG. 9 is a flowchart of an embodiment of a profile generation method.

FIG. 9 is a flowchart of an embodiment of a profile generation method 900. Method 900 is implemented by the device tracking controller 112 to generate profiles based on the behavior of endpoint devices 106 and their users. This process allows the system 100 to associate a set of wireless network devices with a workspace and to generate a profile for the workspace that identifies the set of wireless network devices. The generated profiles allow the system 100 to provide increased network security and protection. For example, the system 100 uses a generated profile to detect when a user enters a restricted access area in response to detecting their wireless network device and determining that the wireless network device is not a member of the wireless network devices associated with the restricted access area. Conventional systems blindly provide connectivity to wireless network devices and do not have knowledge about the physical location of the wireless network devices within their network. In contrast, system 100 provides a mechanism for determining the location of a set of endpoint devices 106, associating the set of endpoint devices 106 with a particular zone within an environment 300, and generating a profile using the association for detecting abnormal or suspicious activity within the environment 300.

A non-limiting example is provided to illustrate how the device tracking controller 112 implements method 900 to determining the location of a set of endpoint devices 106, associating the set of endpoint devices 106 with a particular zone 302 within an environment 300, and generating a profile using the association. As an example, the device tracking controller 112 is configured to generate a zone profile 216 for zone 302 that has limited or restricted access within an environment 300. In this example, only authorized users are allows to enter and access the restricted access zone 302.

At step 902, the device tracking controller 112 receives signal strength information for a set of endpoint devices from one or more access points 116. The device controller 112 may receive the signal strength information for the first endpoint device 106 using a process similar to the process described in step 402 in FIG. 4.

At step 904, the device tracking controller 112 determines a location for the one or more access points 116 identifying a zone 302 within an environment 300. The device controller 112 may determine the location for the one or more access points 116 using a process similar to the process described in step 404 in FIG. 4. For example, the device tracking controller 112 may determine the one or more access points 116 are on a particular floor within a building or within a particular area 304.

At step 906, the device tracking controller 112 associates the set of endpoint devices 106 with the zone 302 in the environment 300. At step 908, the device tracking controller 112 generates a zone profile 216 identifying the zone 302 and the set of endpoint devices 106. For example, the device tracking controller 112 may generate a data structure (e.g. a table) that links the identified set of endpoint device 106 with the identified zone 302. The zone profile 216 may further comprise device information, manufacturer information, time stamps, and/or any other suitable type of information. In one embodiment, the device tracking controller 112 tracks movement behavior for the endpoint devices 106 within the environment 300, zone 302, and/or area 304 and generates the zone profile 216 comprising the device behavior movement information.

At step 910, the device tracking controller 112 determines whether to generate a user profile 214. For example, the device tracking controller 112 may be configured to automatically generate user profiles 214 for users associated with endpoint devices 106 associated with the zone profile 216. As another example, the device tracking controller 112 generates a user profile 214 in response to a command from a user (e.g. a network administrator). In other examples, the device tracking controller 112 may determine whether to generate a user profile 214 in response to any other type of command or instructions. The device tracking controller 112 proceeds to step 912 when the device tracking controller 112 determines to generate a user profile 214. Otherwise, the device tracking controller 112 terminates method 900 when the device tracking controller 112 determines to not generate a user profile 214.

At step 912, the device tracking controller 112 receives device information from one or more access points for an endpoint device 106 from the set of endpoint devices 106. For example, the device information may comprise a device identifier, a manufacturer for the endpoint device 106, a MAC address, an IP address, location information, a time stamp, or any other suitable information for the endpoint device 106.

At step 914, the device tracking controller 112 identifies a user associated with the endpoint device 106. For example, the device tracking controller 112 may query network records to identify a user associated with the endpoint device 106. In other examples, the device tracking controller 112 may employ any other suitable technique for identifying a user associated with the endpoint device 106.

At step 916, the device tracking controller 112 generates a user profile 214 for the user based on the received information for the endpoint device 106. For example, the device tracking controller 112 may generate a data structure (e.g. a table) that links the identified user with an endpoint device 106 from the set of endpoint devices 106. The user profile 214 may further comprise user information, an employee identification, device information, manufacturer information, time stamps, and/or any other suitable type of information. In one embodiment, the device tracking controller 112 tracks movement behavior for the user within the environment 300 and generates a user profile 214 that comprises the user's behavior movement information.

In one embodiment, the device tracking controller 112 is configured to periodically identify and monitor the endpoint devices 106 within a particular zone 302 and/or area 304. For example, the device tracking controller 112 may employ a process similar to the process described in method 400 in FIG. 4 to identify and determine the location of one or more endpoint devices 106. The device tracking controller 112 compares the identified endpoint devices 106 to stored zone profiles 216. The device tracking controller 112 may determined whether there are any endpoint devices 106 that are not associated with the particular zone 302 or area 304 based on information provided by the zone profile 216. For instance, the device tracking controller 112 identifies an unknown endpoint device 106 that is not present in the zone profile 216. In other words, the unknown endpoint device 106 is not a member of the endpoint devices 106 associated with a particular area 304. The device tracking controller 112 sends a notification or alert to a network operator or administrator in response to identifying an endpoint device 106 that is not present in the zone profile 216. The notification may comprise a user identifier, a device identifier, a device location, a manufacturer identifier for the endpoint device 106, a time stamp, any other suitable information, or combinations thereof. The device tracking controller 112 may send the notification using any suitable messaging protocol or technique. For example, the notification may be an email, a text message (e.g. SMS message), an application pop-up alert, or any other suitable type of message notification. This process allows the device tracking controller 112 to monitor the environment 300 for suspicious endpoint devices 106 and/or activity and to send notifications about any identified suspicious activities.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a plurality of access points, wherein each access point is configured to measure a signal strength between an access point and endpoint devices; and
a device tracking controller in signal communication with the plurality of access points, comprising:
a device tracking engine configured to:
receive signal strength information for a first endpoint device from at least one access point from the plurality of access points, wherein the signal strength information indicates a signal strength between the first endpoint device and the at least one access point;
receive signal strength information for a second endpoint device from the at least one access point from the plurality of access points, wherein the signal strength information indicates a signal strength between the second endpoint device and the at least one access point;
determine the location of the at least one access point;
determine a first device location for the first endpoint device based on the location of the at least one access point, wherein the first device location identifies a zone within an environment;
determine a second device location for the second endpoint device based on the location of the at least one access point, wherein the second device location identifies the zone within the environment;
update the first device location based on signal strength information from at least one access point from the plurality of the access point;
update the second device location based on signal strength information from at least one access point from the plurality of the access point;
compare the first device location to the second device location;
detect the first endpoint device and the second endpoint device are in different zones within the environment based the comparison; and
send a notification indicating the first endpoint device and the second endpoint device are in different zones within the environment.

2. The system of claim 1, wherein:
the device tracking engine is configured to determine one of the first endpoint device and the second endpoint device is not moving within the environment and the other endpoint device is moving within the environment; and
sending the notification is in response to the determining one of the first endpoint device and the second endpoint device is not moving within the environment and the other endpoint device is moving within the environment.

3. The system of claim 1, wherein:
the device tracking engine is configured to determine the first endpoint device and the second endpoint device are moving in different directions within the environment; and
sending the notification is in response to determining the first endpoint device and the second endpoint device are moving in different directions within the environment.

4. The system of claim 1, wherein:
the device tracking engine is configured to:
determining one of the first endpoint device and the second endpoint device is not moving within the environment;
identify a lost endpoint device from among the first endpoint device and the second endpoint device in response to determining one of the first endpoint device and the second endpoint device is not moving within the environment;
determine the location of the lost endpoint device; and
the notification identifies the location of the lost endpoint device.

5. The system of claim 1, wherein the notification indicates the location of at least one of the first endpoint device and the second endpoint device.

6. The system of claim 1, wherein the notification provides device information about the endpoint device.

7. The system of claim 1, wherein the device tracking controller and the plurality of access points are members of a WiFi network.

8. A method, comprising:
receiving, by a device tracking controller, signal strength information for a first endpoint device from at least one access point from a plurality of access points, wherein the signal strength information indicates a signal strength between the first endpoint device and the at least one access point;
receiving, by the device tracking controller, signal strength information for a second endpoint device from the at least one access point from the plurality of access points, wherein the signal strength information indicates a signal strength between the second endpoint device and the at least one access point;
determining, by the device tracking controller, the location of the at least one access point;
determining, by the device tracking controller, a first device location for the first endpoint device based on the location of the at least one access point, wherein the first device location identifies a zone within an environment;
determining, by the device tracking controller, a second device location for the second endpoint device based on the location of the at least one access point, wherein the second device location identifies the zone within the environment;
updating, by the device tracking controller, the first device location based on signal strength information from at least one access point from the plurality of the access point;

updating, by the device tracking controller, the second device location based on signal strength information from at least one access point from the plurality of the access point;
comparing, by the device tracking controller, the first device location to the second device location;
detecting, by the device tracking controller, the first endpoint device and the second endpoint device are in different zones within the environment based the comparison; and
sending, by the device tracking controller, a notification indicating the first endpoint device and the second endpoint device are in different zones within the environment.

9. The method of claim 8, further comprising:
determining, by the device tracking controller, one of the first endpoint device and the second endpoint device is not moving within the environment and the other endpoint device is moving within the environment; and
wherein sending the notification is in response to the determining one of the first endpoint device and the second endpoint device is not moving within the environment and the other endpoint device is moving within the environment.

10. The method of claim 8, further comprising:
determining, by the device tracking controller, the first endpoint device and the second endpoint device are moving in different directions within the environment; and
wherein sending the notification is in response to determining the first endpoint device and the second endpoint device are moving in different directions within the environment.

11. The method of claim 8, further comprising:
determining, by the device tracking controller, one of the first endpoint device and the second endpoint device is not moving within the environment;
identifying, by the device tracking controller, a lost endpoint device from among the first endpoint device and the second endpoint device in response to determining one of the first endpoint device and the second endpoint device is not moving within the environment; and
determining, by the device tracking controller, the location of the lost endpoint device; and
wherein the notification identifies the location of the lost endpoint device.

12. The method of claim 8, wherein the notification indicates the location of at least one of the first endpoint device and the second endpoint device.

13. The method of claim 8, wherein the notification provides device information about the endpoint device.

14. The method of claim 8, wherein the device tracking controller and the plurality of access points are members of a WiFi network.

15. A device, comprising:
a network interface in signal communication with a plurality of access points; and
a device tracking engine operably coupled to the network interface, configured to:
receive signal strength information for a first endpoint device from at least one access point from the plurality of access points, wherein the signal strength information indicates a signal strength between the first endpoint device and the at least one access point;
receive signal strength information for a second endpoint device from the at least one access point from the plurality of access points, wherein the signal strength information indicates a signal strength between the second endpoint device and the at least one access point;
determine the location of the at least one access point;
determine a first device location for the first endpoint device based on the location of the at least one access point, wherein the first device location identifies a zone within an environment;
determine a second device location for the second endpoint device based on the location of the at least one access point, wherein the second device location identifies the zone within the environment;
update the first device location based on signal strength information from at least one access point from the plurality of the access point;
update the second device location based on signal strength information from at least one access point from the plurality of the access point;
compare the first device location to the second device location;
detect the first endpoint device and the second endpoint device are in different zones within the environment based the comparison; and
send a notification indicating the first endpoint device and the second endpoint device are in different zones within the environment.

16. The device of claim 15, wherein:
the device tracking engine is configured to determine one of the first endpoint device and the second endpoint device is not moving within the environment and the other endpoint device is moving within the environment; and
sending the notification is in response to the determining one of the first endpoint device and the second endpoint device is not moving within the environment and the other endpoint device is moving within the environment.

17. The device of claim 15, wherein:
the device tracking engine is configured to determine the first endpoint device and the second endpoint device are moving in different directions within the environment; and
sending the notification is in response to determining the first endpoint device and the second endpoint device are moving in different directions within the environment.

18. The device of claim 15, wherein:
the device tracking engine is configured to:
determining one of the first endpoint device and the second endpoint device is not moving within the environment;
identify a lost endpoint device from among the first endpoint device and the second endpoint device in response to determining one of the first endpoint device and the second endpoint device is not moving within the environment;
determine the location of the lost endpoint device; and
the notification identifies the location of the lost endpoint device.

19. The device of claim 15, wherein the notification indicates the location of at least one of the first endpoint device and the second endpoint device.

20. The device of claim 15, wherein the notification provides device information about the endpoint device.

* * * * *